United States Patent Office 3,573,945
Patented Apr. 6, 1971

3,573,945
PROCESS FOR IMPROVING PIGMENTARY
METAL OXIDES
Harry Lott, Jr., Akron, and Albert Dietz, Wadsworth,
Ohio, assignors to PPG Industries, Inc., Pittsburgh, Pa.
No Drawing. Filed July 6, 1965, Ser. No. 469,881
Int. Cl. C09c 1/36, 3/00
U.S. Cl. 106—300
18 Claims

ABSTRACT OF THE DISCLOSURE

Pigmentary metal oxides, particularly titanium dioxide, are prepared by vapor phase oxidation of corresponding metal halides. A method for wet treating raw metal oxide to improve pigmentary properties is described.

---

This invention relates to a process for wet treating raw pigmentary metal oxide. More particularly, this invention relates to a process for wet treating metal oxide, notably titanium oxide, produced by the vapor phase oxidation of a metal halide and significantly improving the pigmentary properties thereof.

Titanium oxide is currently produced commercially by two processes, the chloride process and the sulfate process.

The chloride process involves the vapor phase oxidation or hydrolysis of at least one titanium halide selected from the group consisting of titanium chloride, titanium bromide, and titanium iodide, e.g., $TiCl_4$, $TiBr_4$ and $TiI_4$.

Typical chloride processes are described in U.S. Letters Patents 2,450,156 to Pechukas; 2,502,347 to Schaumann; 2,653,078 to Lane; 2,750,260 to Nelson et al.; 2,791,490 to Willcox; 2,670,275 to Olson et al.; 2,805,921 to Schaumann; 2,847,316 to Michel et al.; 2,823,982 to Saladin et al.; 2,937,928 to Hughes et al.; 2,968,529 to Wilson; 2,980,509 to Frey; 3,024,089 to Spencer et al.; 3,068,113 to Strain et al.; 3,068,281 to Wilson; 3,069,282 to Allen; and 3,130,008 to Stokes et al.; British Pat. 876,672; and Canadian Pat. 662,785. Likewise, a vapor phase oxidation process may be conducted within a fluidized bed process as disclosed in U.S. Letters Patents 2,760,846 to Richmond; 2,856,264 to Dunn, Jr.; 2,964,386 to Evans et al.; 3,022,137 to Nelson; 3,036,926 to Hughes; 3,073,712 to Wigginton et al.; 3,097,923 to Walmsley.

Such vapor phase oxidation or chloride processes are readily distinguishable from the so-called sulfate processes as disclosed, for example, in U.S. Letters Patents 2,505,-344; 2,766,133; 2,933,408; and 2,982,613.

A common characteristic of such sulfate processes is the recovery of the pigment from an acid slurry ($H_2SO_4$ or HCl) followed by calcination.

The practice of this invention is expressly limited to a vapor phase oxidation or chloride process.

In accordance with the practice of this invention, an aqueous slurry of raw metal oxide produced by the vapor phase oxidation of a metal halide is digested at a high pH and high temperature for a period of time sufficient to convert adsorbed impurity on the pigment surface to a soluble salt.

The adsorbed impurity may be a cation such as oxyhalides of nucleating and/or rutile promoting agents added to the vapor phase reaction. Typical of such agents are compounds or ions of metals such as silicon, aluminum, zinc, potassium, titanium, thorium, zirconium, yttrium, ytterbium, sodium, rubidium, boron, cesium, nickel, calcium, barium, strontium, cadmium, magnesium, and beryllium.

Thus, where $TiCl_4$ is reacted in the vapor phase with oxygen in the presence of metal halides such as $SiCl_4$ and $AlCl_3$, the resulting $TiO_2$ pigment surface may contain adsorbed oxychlorides of silicon and aluminum.

The presence of the impurity on the raw pigment surface gives rise to surface acidity which may cause individual pigment particles to agglomerate with a decrease in over-all pigment properties.

It has been discovered that when raw pigment produced by the vapor phase oxidation of at least one metal halide is treated in accordance with the present invention by digestion at a high pH and a high temperature, the pigmentary properties of the pigment are significantly improved.

More particularly, it has been discovered that the practice of this invention results in a high $pKa$ value (lower or neutral pigment surface acidity), less pigment agglomeration, increased pigment dispersion, increased tinting strength, improved tint tone (or undertone), increased tint efficiency, and a stable slurry pH, particularly in the pH range of 6.0 to 8.0.

Raw pigment, particularly raw titanium dioxide pigment, as used herein, is defined as a pigment (produced by a vapor phase oxidation process) which has had its chemical composition substantially unaltered.

Thus, a pigment after withdrawal from a vapor phase oxidation or hydrolysis zone may be physically treated, e.g., by milling, grinding, hydroseparating, filtering, without changing the basic chemical composition of the pigment. Such pigment is defined herein as a raw pigment.

A raw pigment is therefore to be distinguished from a finished pigment, the latter being a pigment which has been given an organic and/or inorganic coating or treatment as disclosed, for example, in U.S. Letters Pats. 2,046,823 to Johnson; 2,717,246 to Kienle et al.; 2,721,853 to Eastes et al.; 3,146,119 to Dar. Hartien S. Ritter; or copending U.S. patent application Ser. No. 370,349, filed May 26, 1964, now abandoned, by Dr. Neil C. Goodspeed.

In the preferred embodiment of this invention, raw rutile titanium dioxide pigment is digested at a high pH above 10.0, preferably above 11.0, with best results obtained at a pH of 11.5 to 12.0.

The digestion is conducted at a temperature of 50° C. up to the boiling point of the aqueous slurry, preferably 70 to 95° C., ideally above 80° C., for a period of time sufficient to digest pigment surface impurities, preferably at least 30 minutes, usually about one hour.

The pH of the slurry is then adjusted and lowered to a pH of 6.5 to 7.5 by the addition of a selected acid such as a mineral acid, e.g., HCl, $H_2SO_4$, $HNO_3$, or mixtures thereof, and further digested, e.g., at a temperature of 50° C. up to the boiling point for at least 30 minutes. The slurry may then be filtered, the pigment filter cake washed, the cake dried, and milled.

In a further embodiment, the filter cake is repulped and reslurried, and an inorganic or organic agent added to the slurry to treat the pigment. The slurry is again filtered with the cake being washed and dried. The dried pigment may finally be hot milled or micronized (with steam or an inert gas such as nitrogen) before being bagged.

In another embodiment, the raw pigment slurry is digested at a high temperature and high pH, e.g., at a pH above 10.0 and at a temperature above 50° C., for a sufficient period of time. The slurry pH is then lowered to an acid pH range and metal compounds added to the slurry in an amount sufficient to form a coating of hydrous oxide of the metals upon the pigment.

Thus, where the pigment is to be wet coated in accordance with the acid pH process invention of Dr. Hartien S. Ritter, as disclosed in U.S. Letters Patent 3,146,119, soluble salts of titanium and aluminum (e.g., $TiCl_4$ and aluminum chloride or sulfate) are added to the low pH slurry subsequent to digestion at an alkaline pH range. Likewise, as disclosed by Doctor Ritter, a silicon salt such as sodium silicate may be added in addition to the aluminum and titanium salts. The acid slurry is then gradually adjusted in pH with a base, e.g., $NH_3$, to a pH range of 6.5 to 7.8. A gradual adjustment in pH is necessary in order to prevent overly rapid pigment flocculation and precipitation of hydrous oxide upon the pigment. After the slurry has been raised to a pH of 6.5 to 7.8, it is digested again at a temperature above 50° C. and then filtered, washed, dried, and milled.

In a further embodiment of this invention, the raw pigment is digested at a high alkaline pH above 10.0 and at a temperature above 50° C. The pigment is then wet coated in accordance with the basic pH process of Dr. Neil C. Goodspeed, as disclosed in U.S. application Ser. No. 370,349, filed May 26, 1964.

In still a further embodiment, pigment is digested at an alkaline pH and then coated by the Ritter process or Goodspeed process noted hereinbefore, the coated pigment then being given an organic treatment by the addition of organic additives to the slurry. Likewise, the coated pigment may be filtered, washed, repulped, slurried, and then treated with organic additives.

When raw pigment is treated by this invention, the finished treated pigment characteristically has increased dispersion, for example, as determined by electron micrographs.

The pigment also has increased tinting strength and tint tone.

Tinting strength may be determined in accordance with A.S.T.M. D-332-26, "1949 Book of A.S.T.M. Standards," Part 4, page 31, published by American Society for Testing Material, Philadelphia 3, Pa.

Tint tone or undertone of a $TiO_2$ pigment sample may be determined by visually comparing a paste of the pigment with a paste of a selected standard. The paste of each sample and standard is prepared in accordance with A.S.T.M. D-332-26 using carbon black to tint each sample paste to the same depth of grey as the standard. The standard used herein has an oil absorption rating of 20.9 as determined by A.S.T.M. D-281-31, an average particle size of 0.25 micron, as determined with an electron micrograph, and an assigned undertone or tint tone value of Blue 2. The sample is then compared with the standard and an undertone value assigned to the sample by stating whether the sample is bluer or browner than the standard.

The more blue a pigment is, the more pleasing are the optical properties of a paint prepared with the pigment. Conversely, the more brown the pigment, the less pleasing the optical properties of the paint.

The undertone scale used herein ranges from a Brown 10 to a Blue 6 as shown in Table I hereinafter.

TABLE I

| | |
|---|---|
| Brown 10 | Brown 1 |
| Brown 9 | Neutral |
| Brown 8 | Blue 1 |
| Brown 7 | Blue 2 (Standard) |
| Brown 6 | Blue 3 |
| Brown 5 | Blue 4 |
| Brown 4 | Blue 5 |
| Brown 3 | Blue 6 |
| Brown 2 | |

As noted hereinbefore, this invention also improves the pKa value of pigment surface.

The term, pKa, as used herein, refers to the change of color of certain indicator dyes as the result of interaction with a solid surface, as disclosed by H. A. Benesi in his article, "Acidity of Catalyst Surfaces," published in the Journal of the American Chemical Society, 78, 5490 (1956).

pKa is thus a measure of the base strength of the indicator. If the base strength of the indicator is high, a weak acid or weak surface activity is necessary to cause a color change. A low base strength of the indicator requires a strong acid or strong surface activity to produce a color change.

The pKa of a pigment is an indirect measure of its wetting properties and its tendency to agglomerate, particularly in organic vehicles. It is highly desirable that the pigment have a high positive pKa value and a neutral or low surface acidity.

The pKa scale as used herein is given in Table II.

TABLE II

| pKa range | Description | $H_2SO_4$ equivalent, percent by weight |
|---|---|---|
| +6.8, +4.0 | Neutral | $8 \times 10^{-8} – 5 \times 10^{-6}$ |
| +4.0, +3.3 | Mildly acidic | $5 \times 10^{-6} – 3 \times 10^{-4}$ |
| +3.3, +1.5 | Acidic | $3 \times 10^{-4} – 0.02$ |
| +1.5, −3.0 | Very acidic | 0.02–48 |
| −3.0, −5.6 | Extremely acidic | 48–71 |
| −5.6, −8.2 | Very extremely acidic | 71–90 |

The pKa range of 4.0 to 6.8 is thus written +6.8, +4.0. Typical pKa indicators are given in Table III.

TABLE III

| pKa | Indicator | Basic color | Acid color |
|---|---|---|---|
| +6.8 | Neutral red | Yellow | Red. |
| +4.0 | Phenylazonaphthylamine | do | Red. |
| +3.3 | Butter yellow | do | Red. |
| +1.5 | Benzeneazodiphenylamine | do | Purple. |
| −3.0 | Dicinnamalacetone | do | Red. |
| −5.6 | Benzalacetophenone | Colorless | Yellow. |
| −8.2 | Anthraquinone | do | Do. |

When raw titanium dioxide pigment is produced by the vapor phase oxidation of a titanium tetrahalide such as $TiCl_4$, it has a highly acidic surface corresponding to a pKa value of less than −3.0. However, when such pigment is treated in accordance with the practice of this invention, pKa value of the raw digested pigment is increased to at least +4.0, +3.3. When the raw pigment is digested and coated with hydrous oxides, the finished pigment has a pKa of +6.8, +4.0.

When raw titanium oxide is not digested at a high pH and high temperature in accordance with this invention, it characteristically has an unstable slurry pH. This is a disadvantage in the preparing of paints wherein a stable pH is required, particularly in the range of 6.5 to 7.5. When the raw pigment is treated in accordance with this invention, an aqueous slurry of the pigment does have the necessary pH stability within the necessary range.

This invention further increases the tint efficiency of the titanium oxide pigment.

Tint efficiency as used herein refers to the reflectometry method disclosed on pages 704 to 715, vol. 34, Journal of Paint Technology and Engineering, (Official Digest, July, 1962).

A standard common commercial type enamel paint is prepared out of a known amount of a standard pigment, vehicle, and colorant (tint).

An enamel paint is also prepared from the sample pigment, and compared with the standard using a reflectometer.

Pigments treated in accordance with the embodiments of this invention typically have a tint efficiency of at least 98 percent, usually 100 percent that of the standard as measured with a reflectometer.

Raw titanium dioxide pigment produced by the vapor phase oxidation of $TiCl_4$ characteristically has a low tint efficiency. Often raw pigment will float or flood such that its tint efficiency cannot be determined. Floating or flooding is where the pigment floats to the top of the paint film and/or the tint has flocculated to the bottom of the film.

The following are typical working examples, representing the best mode contemplated by the inventors in the carrying out of this invention.

EXAMPLE I

Titanium tetrachloride ($TiCl_4$) is reacted in the vapor phase with oxygen at 1000° C. in the presence of aluminum trichloride ($AlCl_3$) and silicon tetrachloride ($SiCl_4$) to produce a raw titanium oxide pigment containing about 1.80+0.15 percent by weight $Al_2O_3$ and about 0.56±0.05 percent by weight $SiO_2$, basis the weight of the titanium oxide pigment, the pigment having a tinting strength of 1670, an undertone of Brown 1, and a pK$a$ of −3.0, −5.6.

An aqueous slurry is prepared containing 20 percent by weight of the raw pigment, basis the total weight of the slurry, and adjusted with NaOH from a pH of about 4.2 to 11.5 and is digested at 80° C. for 60 minutes.

The raw alkaline digested pigment slurry is adjusted with $H_2SO_4$ to a pH of 6.5 and digested at 80° C. for 30 additional minutes. At the end of the digestion, the slurry pH is 6.3.

The slurry is filtered and the resulting pigment filter cake is washed and dried overnight at 65° C.

The dry, digested, uncoated raw titanium oxide pigment has a tinting strength of 1760, a neutral tint tone, a pK$a$ of +4.0, +3.3, and an oil absorption of 19.1. An aqueous slurry of this pigment has a pH of 6.5, about the same as the slurry pH immediately subsequent to the final 30-minute digestion.

EXAMPLE II

The raw slurry of Example I containing 20 percent by weight titanium oxide and having a pH of 4.2 is digested at 85° C. for 1.5 hours, during which the pH dropped to 3.4.

The slurry is adjusted to 7.1 with NaOH and digested at 85° C. After 15 minutes digestion, the slurry pH has dropped to 6.85. During a three hour digestion period at 85° C., the pH varies between 6.6 and 6.8.

The slurry is filtered and the cake washed to a specific resistance in excess of 10,000 ohms. After drying over night in an oven at 65 to 70° C., the pigment cake is slurried in water (as in Example I) and is found to have a pH of 8.8.

EXAMPLE III

Titanium tetrachloride ($TiCl_4$) is reacted in the vapor phase with oxygen at 1000° C. in the presence of aluminum trichloride ($AlCl_3$) and silicon tetrachloride ($SiCl_4$) to produce a raw titanium oxide pigment containing about 1.80±0.15 percent by weight $Al_2O_3$ and about 0.56±.05 percent by weight $SiO_2$, basis the weight of the titanium oxide pigment, the pigment having a tinting strength of 1670, an undertone of Brown 1, and pK$a$ of −3.0, −5.6.

An aqueous slurry is prepared containing 20 percent by weight of the raw titanium oxide pigment, basis the total weight of the slurry, and adjusted with NaOH from a pH of about 4.0 to 12.0 and digested at 85° C. for 90 minutes.

A sample of the raw, digested pigment is then wet coated in an acid pH range with 2.0 percent by weight hydrous alumina and 1.0 percent by weight hydrous titania, basis the weight of the pigment, using aluminum sulfate and $TiCl_4$ salt solutions and the Acid Coating process of U.S. Letters Patent 3,146,119, issued to Dr. Hartien S. Ritter.

The coated pigment has a final tinting strength of 1780, an undertone of Blue 1, a neutral pK$a$ of +6.8, +4.0, a tint efficiency of 98 percent, and an oil absorption of 20.8.

A sample of the raw, digested pigment is also coated in a basic pH range with 2.0 percent by weight hydrous alumina and 1.0 percent by weight hydrous titania, basis the weight of the pigment, using aluminum sulfate and $TiCl_4$ salt solutions and the basic pH process of Dr. Neil C. Goodspeed, as disclosed in copending U.S. application Ser. No. 370,349, filed May 26, 1964.

The coated pigment has a final tinting strength of 1790, an undertone of Blue 2, a neutral pK$a$ of +6.8, +4.0, a tint efficiency of 99 percent, and an oil absorption of 20.8.

EXAMPLE IV

Titanium tetrachloride ($TiCl_4$) is reacted in the vapor phase with oxygen in the presence of $AlCl_3$ and $SiCl_4$ to produce a raw titanium oxide pigment containing 1.80±.15 percent by weight $Al_2O_3$ and 0.56±0.05 percent by weight $SiO_2$, basis the weight of the titanium oxide pigment.

The raw titanium oxide pigment has a tinting strength of 1670, an undertone of Brown 1, and a pK$a$ of −3.0, −5.6. A tint efficiency cannot be determined for the raw pigment because of floating of the pigment.

An aqueous slurry is prepared containing 20 percent by weight of the titanium oxide pigment, basis the total weight of the slurry.

The slurry is adjusted with NaOH from a pH of about 4.4 to about 11.8 and digested at 85° C. for 93 minutes. The slurry is maintained at a pH of about 11.8 throughout the digestion by the addition of $NaOH_3$.

HCl is added to the slurry during a period of 104 minutes to lower the pH gradually to 6.5. The slurry is again digested at 85° C. for 59 minutes. At the end of the digestion, the slurry pH is 6.2.

The slurry is filtered and the resulting titanium oxide filter cake washed with 16 displacements of water. The cake is dried over night at 65° C.

The dry, uncoated titanium oxide pigment has a tinting strength of 1770, a neutral undertone, a pK$a$ of +4.0, +3.3, and a tint efficiency of 105 percent. An aqueous slurry of the pigment has a pH of 5.8.

Although this invention has been described with particular reference to the production of pigmentary $TiO_2$ from titanium halide, especially a titanium tetrahalide selected from the group consisting of $TiCl_4$, $TiBr_4$ and $TiI_4$, it may be employed in treating other raw metal oxides. The term "metal" as employed herein is defined as including those elements exhibiting metal-like properties including the metalloids.

Examples, not by way of limitation of metal oxides, which may be treated by the aforementioned process are the oxides of aluminum, arsenic, beryllium, boron, gadolinium, germanium, hafnium, lanthanum, iron, phosphorus, samarium, scandium, silicon, strontium, tantalum, tellurium, terbium, thorium, thulium, tin, titanium, ytterium, ytterbium, zinc, zirconium, niobium, gallium, antimony, lead, and mercury.

While this invention has been described by reference to specific details of certain embodiments, it will be understood that the invention is not intended to be construed as limited to such details, except insofar as they are included in the appended claims.

What is claimed is:

1. A process for reducing the surface activity of raw titanium dioxide pigment produced by vapor phase oxidation of at least one titanium tetrahalide selected from the group consisting of $TiCl_4$, $TiBr_4$ and $TiI_4$ in the presence of nucleating or rutile promoting agents which comprises digesting an aqueous slurry of the pigment at a pH above 11.0, and at a temperature of from 50° C. to the boiling point of the slurry for a period of time sufficient to convert adsorbed impurity on the pigment surface to a soluble salt.

2. In a process for producing coated metal oxide pigment wherein raw pigment produced by vapor phase oxidation of a metal halide in the presence of nucleating or rutile promoting agents is coated with at least one hydrous metal oxide, the improvement which comprises digesting an aqueous slurry of the raw pigment at a pH above 11.0 and at a temperature of from 50° C. to the boiling point of the slurry for a period of time sufficient to convert adsorbed impurity on the pigment surface to a soluble salt.

3. A process for treating raw titanium dioxide pigment produced by vapor phase oxidation of titanium tetrachloride in the presence of nucleating or rutile promoting agents which comprises digesting an aqueous slurry of the pigment at a pH of between 11.5 and 12.0 and at temperatures of between 70° and 95° C. for at least 30 minutes and recovering titanium dioxide of reduced surface activity.

4. A process for treating raw titanium dioxide pigment produced by vapor phase oxidation of titanium tetrachloride in the presence of nucleating or rutile promoting agents which comprises digesting an aqueous slurry of the pigment at a pH of between 11.5 and 12.0 and at a temperature of from at least 80° C. to the boiling point of the slurry for at least one hour, adjusting the pH of the digested slurry to between 6.5 and 7.5, further digesting the slurry for at least one hour, filtering the slurry, washing the pigment filter cake, drying and recovering a pigment having a stable pH of between 6.5 and 7.5 in aqueous slurry.

5. A process for reducing the surface activity of raw pigmentary metal oxide produced by vapor phase oxidation of metal halide in the presence of nucleating or rutile promoting agents which comprises digesting an aqueous slurry of such oxide at pH levels above 10.0 and at temperatures of from 50° C. to the boiling point of the slurry for a period of time sufficient to reduce the surface activity of the raw metal oxide.

6. A process for improving the pKa value of raw pigmentary titanium dioxide produced by vapor phase oxidation of titanium tetrahalide selected from the group consisting of titanium tetrachloride, titanium tetrabromide, and titanium tetraiodide in the presence of nucleating or rutile promoting agents, which comprises digesting an aqueous slurry of such titanium dioxide at pH levels above 10.0 and at temperatures of from at least 50° C. to the boiling point of the slurry for a period of time sufficient to raise the pKa value to at least +4.0, +3.3.

7. A process for improving the pKa value of pigmentary titanium dioxide produced by vapor phase oxidation of titanium tetrahalide selected from the group consisting of titanium tetrachloride, titanium tetrabromide, and titanium tetraiodide in the presence of nucleating or rutile promoting agents which comprises digesting an aqueous slurry of raws pigmentary titanium dioxide at pH levels above 10.0 and at temperatures of from at least 50° C. to the boiling point of slurry for at least thirty minutes, coating digested titanium dioxide pigment in an aqueous medium with at least one hydrous metal oxide, and recovering titanium dioxide pigment having a pKa value of +6.8, +4.0.

8. A process which comprises establishing an aqueous slurry of raw prigmentary titanium dioxide produced by vapor phase oxidation of titanium tetrahalide selected from the group consisting of titanium tetrachloride, titanium tetrabromide, and titanium tetraiodide in the presence of nucleating or rutile promoting agents, adjusting the pH of the slurry to levels above 10.0, digesting such slurry at temperatures of from at least 50° C. to the boiling point of the slurry for a period of time sufficient to digest pigment surface impurities and recovering titanium dioxide having a reduced surface activity.

9. A process which comprises establishing an aqueous slurry of raw pigmentary titanium dioxide produced by vapor phase oxidation of titanium tetrahalide selected from the group consisting of titanium tetrachloride, titanium tetrabromide, and titanium tetraiodide in the presence of nucleating or rutile promoting agents, adjusting the pH of the slurry to levels above 10.0, digesting such slurry at temperatures of from at least 50° C. to the boiling point of the slurry for a period of time sufficient to digest pigment surface impurities, adjusting the pH of such slurry to a pH off rom 6.5 to 7.5 with an acidic reagent and recovering titanium dioxide having a reduced surface activity and a stable pH in aqueous slurry.

10. A process which comprises establishing an aqueous slurry of raw pigmentary titanium dioxide produced by vapor phase oxidation of titanium tetrahalide selected from the group consisting of titanium tetrachloride, titanium tetrabromide, and titanium tetraiodide in the presence of nucleating or rutlie promoting agents, adjusting the pH of the slurry to levels above 10.0, digesting the slurry at temperatures of from at least 50° C. to the boiling point of the slurry for a period of time sufficient to digest pigment surface impurities, coating the digested pigment with at least one hydrous metal oxide, and recovering coated titanium dioxide.

11. A process which comprises establishing an aqueous slurry having a pH level above 10.0 of raw pigmentary titanium dioxide produced by vapor phase oxidation of titanium tetrahalide selected from the group consisting of titanium tetrachloride, titanium tetrabromide, and titanium tetraiodide in the presence of nucleating or rutile promoting agents, digesting the slurry at temperatures of from 50° C. to the boiling point of the slurry for a period of time sufficient to digest pigment surface impurities and recovering titanium dioxide having a reduced surface activity.

12. A process which comprises establishing an aqueous slurry having a pH level above 10.0 of raw pigmentary titanium dioxide produced by vapor phase oxidation of titanium tetrahalide selected from the group consisting of titanium tetrachloride, titanium tetrabromide, and titanium tetraiodide in the presence of nucleating or rutile promoting agents, digesting the slurry at temperatures of at least 50° C. to the boiling point of the slurry for a period of time sufficient to digest pigment surface impurities, coating digested pigment in an aqueous medium with hydrous oxides of aluminum and titanium, digesting the coated pigment in said aqueous medium at pH levels of from 6.5 to 7.5 for at least thirty minutes, and at a temperature of at least 50° C. and recovering hydrous metal oxide coated titanium dioxide.

13. A process which comprises establishing an aqueous slurry having a pH level above 10.0 of raw pigmentary titanium dioxide produced by vapor phase oxidation of titanium tetrahalide selected from the group consisting of titanium tetrachloride, titanium tetrabromide, and titanium tetraoidide in the presence of nucleating or rutile promoting agents, digesting the slurry at temperatures of from at least 50° C. to the boiling point of the slurry for a period of time sufficient to digest pigment surface impurities, coating the digested pigment in an aqueous medium with hydrous oxides of aluminum, titanium, and silicon, digesting the coated pigment in said aqueous medium at pH levels of from 6.5 to 7.5 for at least thirty minutes at temperatures of at least 50° C. and recovering hydrous metal oxide coated titanium dioxide.

14. A process according to claim 5 wherein the slurry pH during digestion is above 11.0 and the digestion period is at least 30 minutes.

15. A process according to claim 5 wherein the slurry pH during digestion is between 11.5 and 12.0.

16. A process according to claim 5 wherein the metal oxide is titanium dioxide.

17. A process according to claim 5 wherein the metal oxide is pigmentary titanium dioxide that has been produced by vapor phase oxidation of titanium tetrahalide in the presence of at least one metal halide selected from the group consisting of compounds of aluminum, silicon, potassium, zinc, zirconium, thorium, and boron.

18. A process according to claim 17 wherein the digestion is conducted at temperatures above 80° C. and for a period of at least thirty minutes.

References Cited

UNITED STATES PATENTS

| | | | |
|---|---|---|---|
| 3,035,966 | 5/1962 | Suita | 106—300UX |
| 3,146,119 | 8/1964 | Ritter | 106—300 |
| 3,172,772 | 3/1965 | Rowe | 106—300 |
| 3,251,705 | 5/1966 | Rieck et al. | 106—300 |
| 3,253,889 | 5/1966 | Wildt et al. | 106—300X |
| 3,383,231 | 5/1968 | Allan | 106—300 |
| 2,512,079 | 6/1950 | Werner | 23—202V |
| 2,875,107 | 2/1959 | Daiger | 23—202X |
| 3,060,002 | 10/1962 | Leddy et al. | 23—202 |

FOREIGN PATENTS

| | | | |
|---|---|---|---|
| 684,016 | 12/1952 | Great Britain | 23—202V |

HELEN M. McCARTHY, Primary Examiner

H. M. S. SNEED, Assistant Examiner

U.S. Cl. X.R.

23—202; 106—308, 309